July 31, 1973  R. J. JASINSKI ET AL  3,749,607
LITHIUM BATTERIES HAVING A CATHODE COMPOSITION COMPRISING
A MIXTURE OF NICKEL SULFIDE AND ALUMINUM
Filed Aug. 25, 1969  2 Sheets-Sheet 1
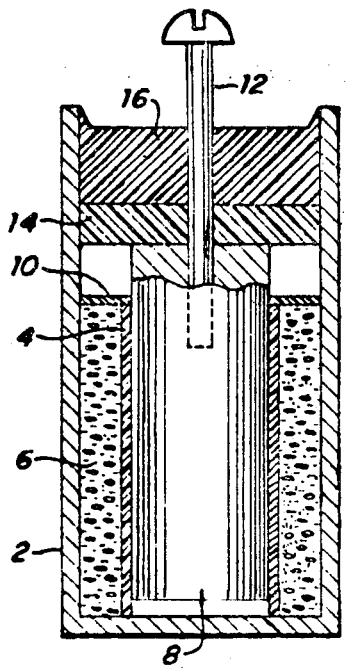
FIG. 1.
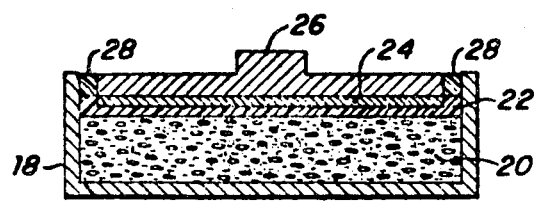
FIG. 2.
FIG. 3.
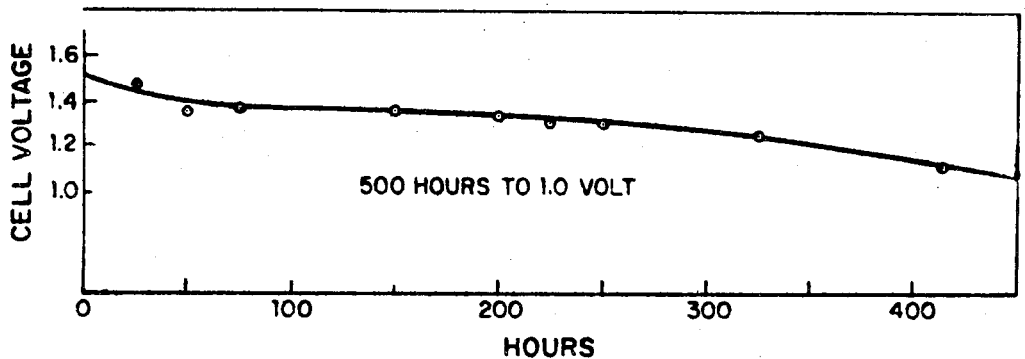
500 HOURS TO 1.0 VOLT
FIG. 4.
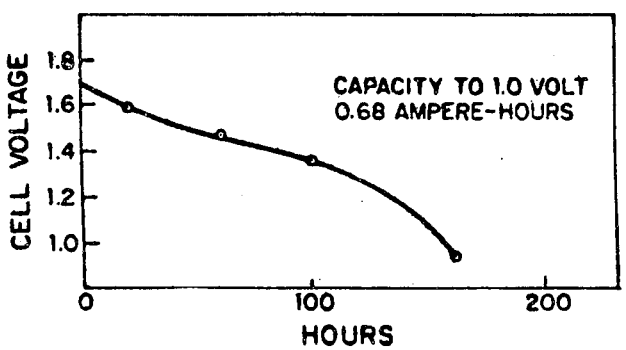
CAPACITY TO 1.0 VOLT
0.68 AMPERE-HOURS United States Patent Office 3,749,607
Patented July 31, 1973

3,749,607
LITHIUM BATTERIES HAVING A CATHODE COMPOSITION COMPRISING A MIXTURE OF NICKEL SULFIDE AND ALUMINUM
Raymond J. Jasinski, Boston, and Lewis H. Gaines, Framingham, Mass., assignors to Tyco Laboratories, Inc., Waltham, Mass.
Filed Aug. 25, 1969, Ser. No. 852,557
Int. Cl. H01m 17/00
U.S. Cl. 136—83 R
13 Claims

ABSTRACT OF THE DISCLOSURE

A battery comprising a lithium anode, a cathode comprising nickel sulfide and aluminum fibers, and an electrolyte made up of an ionizable inorganic salt dissolved in an aprotic organic solvent.

This invention relates to lithium batteries and more particularly to improvements in electric cells of the type comprising lithium anodes in nonaqueous electrolytes.

A variety of batteries employing lithium metal negative electrodes are known (as exemplified by U.S. Pats. 3,248,265; 3,279,952; 3,380,855; 3,393,092 and 3,393,093) and a number of different cathodes and electrolytes have been used in attempts to produce lithium batteries with good shelf life as well as high energy densities. Essentially the performances of typical nonaqueous lithium batteries already known in the art are limited primarily by the positive electrode, although some difficulties are attributable to particular electrolytes. Many positive electrodes with acceptable electrochemical properties have high solubilities and, therefore, poor shelf life. Materials such as $CuCl$, $AgCl$, and $CuF_2$ must first dissolve in order to discharge. However, metal ions, once in solution, can reach the lithium electrode and discharge chemically.

This solubility problem is particularly insidious in the case of metal chloride positives since one of the discharge products, $Cl^-$ ion, causes dissolution of an otherwise insoluble positive plate material. With certain materials such as nickelous fluoride, it is difficult to reproduce cathodes with acceptable electrochemical performance. Achieving lithium batteries with satisfactory performance also has been hampered by use of electrolytes with components that have a solubilizing effect during cell discharge. In addition to the foregoing problems, there have been difficulties in producing lithium batteries that are useable at temperatures near the boiling point and below the freezing point of water, have a high energy to weight ratio and have a substantially flat discharge characteristic at a satisfactory voltage level over a relatively long period of time.

Accordingly, the primary object of this invention is to provide novel lithium batteries that are characterized by high energy densities, and good shelf life at ambient temperatures, e.g. 70° F.

Another object is to provide lithium batteries that have satisfactory shelf life and operational life at temperatures up to at least 160° F.

A further object is to provide lithium batteries that operate well at temperatures as low as −29° F.

Still another object is to provide new and improved cathodes for lithium batteries.

A specific object of this invention is to provide a new and improved cathode for lithium batteries that is stable in the battery electrolyte for extended periods at both ambient and elevated temperatures and is relatively lightweight.

These and other objects of the invention are achieved by a novel battery system which is made up of a lithium anode, an electrolyte that comprises an ionizeable salt in an organic, aprotic solvent, and a cathode made up of nickel sulfide and aluminum fibers, with the fibers acting as a binder for the nickel sulfide.

Further features are disclosed and many of the attendant advantages of the invention are described or rendered obvious by the following detailed specification which is to be considered together with the accompanying drawings wherein:

FIG. 1 illustrates schematically a Leclanche type battery embodying the invention;

FIG. 2 illustrates schematically a button type cell embodying the invention;

FIGS. 3 and 4 illustrate the discharge at room temperature of Leclanche type cells embodying $Ni_3S_2$ and $NiS_2$ positive electrodes;

Figure 6:
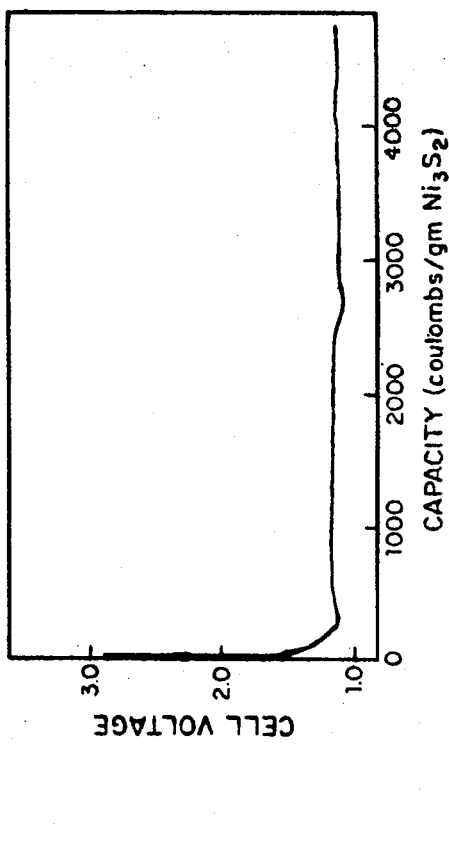
Figure 7:
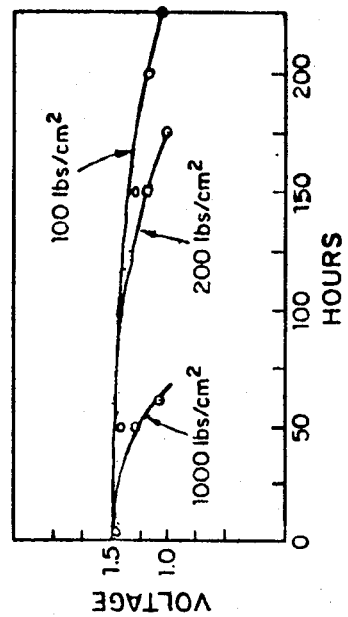
Figure 5:
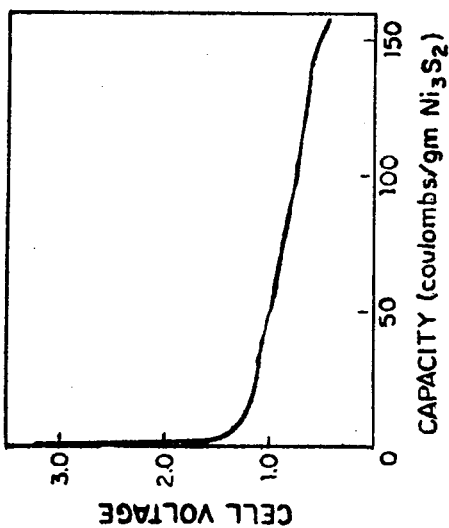

FIGS. 5 and 6 compare the performances at −18° C. of Leclanche type cells without and with the addition of tetrahydrofuran to the lithium perchlorate-propylene carbonate electrolyte; and FIG. 7 illustrates the effect on discharge performance of the compaction pressure of pressed positive electrodes.

It has been recognized that one possible way of solving the problems presented by high electrode solubility is to employ separator membranes to prevent migration of metal ions to the negative electrode. However, this particular approach presents its own problems in achieving membrane perfection and stability and low ohmic losses. The present invention is the result of a different approach which is to make the cathode of a material, preferably of good electrical conductivity, that is insoluble in aprotic, organic solvents. Essentially the invention involves using selected nickel sulfides as a cathode material and forming stable cathodes by using aluminum fibers as a conductive binder for the cathode material.

The term "nickel sulfide" is generic to six stable, crystallographically defined sulfides: $Ni_3S_2$, $Ni_6S_5$, $Ni_7S_6$, $NiS$, $Ni_3S_4$ and $NiS_2$. All of these species meet the requirements of being (1) electrochemically active, (2) chemically stable, and (3) insoluble in selected aprotic, organic solvents. Additionally, they appear not to produce or be subject to undesirable side reactions such as electrolyte decomposition or formation of soluble intermediates, and they are also compatible with a light-weight electrode structure, i.e. they do not require large amounts of conducting binder to form a stable electrode structure.

The equivalent weights and maximum theoretical energy densities of this series of compounds in lithium/nickel sulfide couples varies as shown in Table I:

TABLE I
Equivalent Weight of Li/Ni Sulfide Couples

| Compound | Equivalent weight (grams) | Maximum energy density (watt-hour/lb.) |
|---|---|---|
| $Ni_3S_2$ | 67 | 388 |
| $Ni_6S_5$ | 58 | 450 |
| $Ni_7S_6$ | 54 | 482 |
| $NiS$ | 52 | 500 |
| $Ni_3S_4$ | 42 | 620 |
| $NiS_2$ | 38 | 685 |

With respect to this table, the equivalent weight includes the weight of the required lithium but not the electrolyte and the energy density in watt-hours/lb. is based on an open circuit potential of 1.8 volts. The reaction products are assumed to be $Li_2S$ and nickel metal. $Li_2S$ is substantially insoluble in the electrolyte which consisted of 1 N lithium perchlorate dissolved in propylene carbonate. The high energy density of the $Li/NiS_2$ couple reflects the discharge of the $(S—S)^=$ ion as well as the reduction of divalent nickel. The use of lithium sulfides with high sulfur content provides high energy densities, i.e. energy densities approaching that of the Li/CuF$_2$ couple which is approximately 740 watt-hours/lb. However, a high energy density is not the sole criterion for selecting a positive plate material. In addition to the other requirements set forth above, consideration must be given to cost and ease of obtaining particular nickel sulfides with satisfactory purity, the voltages obtainable, the relative conductivities of the several sulfides, and the problems involved in constructing positive electrodes. Accordingly, in the practice of this invention, it is preferred to use Ni$_3$S$_2$, NiS$_2$ and NiS as the positive plate materials. Of these three species of nickel sulfide, Ni$_3$S$_2$ is most preferable since it is easiest to use in fabricating electrodes. Moreover, Ni$_3$S$_2$ is an electronic conductor while NiS$_2$ and NiS are both insulators; hence an electrode utilizing the former requires less conductive binder than either of the latter. Although Ni$_3$S$_2$ has a lower energy density and gives a somewhat lower cell voltage as compared to NiS$_2$ and NiS, a lithium cell employing Ni$_3$S$_2$ as the positive electrode provides a relatively better power output and a greater percentage utilization of the positive electrode material. NiS$_2$ is more preferable than NiS since it has the greatest energy density and gives the highest cell voltage. However, the cell power output is less. NiS is least preferable of these three species of nickel sulfide since it gives a cell voltage less than NiS$_2$, a power output less than Ni$_3$S$_2$, and is difficult to fabricate into an electrode structure.

Successful full cell discharges have been achieved with two different types of positive electrodes made up of nickel sulfide and aluminum fibers: (a) Leclanche type pastes, and (b) pressed electrodes. The Leclanche type pastes are more useful at relative-low discharge rates (i.e. greater than several hundred hours in discharge time). The pressed powder electrodes (in button cell configurations) are the easiest to fabricate. The LeClanche type cell is characterized by high energy densities on both a weight and volume basis because of the large fraction of interior volume that is available for active positive electrode material and the high utilization of positive material that can be achieved at low currents.

As indicated above, the aluminum fibers function as a binder for the positive electrode. A binder is required due to the tendency of nickel sulfide electrodes to expand during discharge (Li$_2$S is formed as a reaction product, and it occupies a larger volume than the lithium metal or electrolyte which it displaces). The binder offsets the tendency of the positive plate material to come apart as a result of the expansion noted above. The binder also maintains a continuous conductive path during cell discharge.

In the making of this invention, a number of other conductive binders have been considered for the positive electrode, including nickel powder and graphite powder. However, these other materials do not offer the same advantages as aluminum fibers. The latter do not absorb water, are highly conductive, are lightweight and hence do not add materially to the weight of the electrode and cell, and the fiber form offers a greatly superior binding action while providing a continuous conductive path during cell discharge. In this connection, it is to be noted that the satisfactory performance of aluminum as a binder is surprising since it would be expected to corrode electrochemically, but instead is surprisingly stable. Apparently, the aluminum partices have a protective film on their surfaces that protects them from corrosion while allowing them to conduct current. While aluminum powder has many of the foregoing advantages of aluminum fibers, its binding action is substantially less. Accordingly, while aluminum powder may be used as the binder, it is preferred to use aluminum fibers. Nickel powders are limited by greater weight and cost. Graphite powder is limited by the difficulty and cost involved in removing from its high surface area gas-producing impurities such as moisture which can lead to cell failure through excessive gassing.

Production of the different species of nickel sulfide is accomplished according to well known procedures. By way of example, Ni$_3$S$_2$ is prepared by the reduction of anhydrous NiSO$_4$ by hydrogen. NiS is formed by reacting 1.5 M NiCl$_2$·6H$_2$O with 0.5 M (NH$_4$)$_2$S. The resulting precipitate is washed thoroughly with water and heated at 120° C. under nitrogen to eliminate moisture. NiS may be prepared by the same procedure as NiS but using 0.5 M NiCl$_2$·6H$_2$O and 1.5 M (NH$_4$)$_2$S. Washing and drying of the NiS and NiS$_2$ precipitates is critical.

Turning now to FIG. 1, a preferred form of a Leclanche type cell comprises a cylindrical aluminum can 2 that serves as both the cell container and the positive terminal. The can also may be made of some other conductive material that is not corroded by the electrodes or electrolyte, e.g. a nickel-plated steel. Mounted within the cell is a cylindrical separator sleeve 4 made of an ionically permeable electronically insulating material that allows ionic conduction between the negative and positive plate materials while physically separating the two so as to prevent direct electronic conduction. The separator preferably is made of coarsely woven glass fiber sleeving. A substitute material for the separator is a plastic fabric such as polypropylene mat having small pores or openings therein just large enough to make it permeable to ions but not large enough to permit through flow of positive plate material. Other materials known to the capable of serving as ion permeable membranes also may be used. The space between the separator sleeve 4 and the side wall of can 2 is filled with a paste 6 made up of the positive material and the electrolyte, the positive material comprising nickel sulfide and aluminum binder and the electrolyte comprising lithium perchlorate or potassium hexafluorophosphate in propylene carbonate or other aprotic organic solvent. Tetrahydrofuran also may be added to the paste for low temperature operation. The lithium metal negative electrode is in the form of a rod 8 which is disposed within the separator 4 in direct contact therewith. A retaining washer 10 made of a suitable insulating material such as Teflon or other inert substance is slipped over the lithium rod 8 in engagement with the end of separator 4. The washer 10 makes a snug friction fit so as to retain the paste 6. The upper end of the lithium rod is fitted with a conductive pin 12 that projects from the can 2 and serves as the negative terminal of the battery. By way of example, pin 12 may be made of nicked plated steel or stainless steel. A second washer 14 made of a suitable insulating material such as Teflon or other inert substance is mounted within the can 2 over the pin 12 up against the outer end of the lithium electrode. Sealing of the cell is accomplished by applying a suitable insulating potting compound as shown at 16 over the washer 14. Various conventional potting compounds may be used, such as a flexible polysulfide/epoxy adhesive or a rigid alumina-filled adhesive cement.

FIG. 2 illustrates a button type cell embodying the invention. The cell comprises a thin-walled shallow metal case 18 made of a conductive metal such as aluminum so as to serve as the positive terminal. The case is partially filled with a composition 20 comprising positive plate material soaked with electrolyte. The positive plate material comprises a selected nickel sulfide and aluminum binder of the nature described, formed as a dry mixture and pressed into the case. The electrolyte is added to the positive material after the latter has been pressed into the case. The layer of positive material is porous and hence absorbs the electrolyte. Also disposed in the case is a cup-shaped member 22 adapted to function as a cell separator and electrolyte retainer. The member 22 is made of an insulating material that permits ionic but not electronic conduction between the positive and negative plate materials. Preferably it is made of a nonwoven polypropylene mat. Disposed on top of and in contact with the member 22 is a lithium electrode 24. This electrode is preferably made from lithium foil. A contact member 26 made of a conductive material that is not corroded readily by lithium, is placed on top of the lithium electrode and secured in place by a suitable potting compound 28. Preferably, the contact member is made of magnesium metal. However, it also may be made of other noncorrosive material such as brass, nickel plated steel, or stainless steel. The contact member serves as the negative terminal of the cell.

The invention is further understood by consideration of the following examples which are given for the purpose of illustration and are not intended to limit the scope of the invention.

EXAMPLE I

A Leclanche type cell embodying the design illustrated in FIG. 1 was constructed using an aluminum case 2 whose outside dimensions resembled closely those of a conventional zinc-manganese dioxide "C" cell, i.e. an outer diameter of about 1.03 inch and a height of about 1.83 inch. The case had a wall thickness of about 0.020 inch. The lithium electrode 8, cut from a lithium metal rod, was approximately 1-inch high and had an outside diameter of 0.5 inch. The separator 4 was a section of coarsely woven fiberglass sleeving with a thickness of about 0.030 inch. The paste of positive material and electrolyte was prepared by mixing powdered $Ni_3S_2$ with small aluminum fibers (measuring approximately 0.005" x 0.005" in cross-section and 0.125" to 0.25" long) in the ratio of 8:2 by weight, and combining the mixture with a sufficient amount of a 1 M solution of lithium perchlorate in propylene carbonate to form a thick paste. The lithium rod (with the negative terminal 12 attached) and the separator were inserted first into the case and then the positive material-electrolyte paste was added in a quantity such that the total amount of positive material ($Ni_2S_3$ and aluminum fibers) was 15 grams. The retaining washer 10 made of Teflon was installed next, followed by the second Teflon washer 14. In some cases polypropylene washers have been substituted. The two washers were separated from each other as shown in FIG. 1 to provide ample expansion space for the paste during cell discharge. The cell was sealed by an epoxy potting compound substantially as shown at 16 in FIG. 2. The total cell weight was 40 grams. FIG. 3 shows the performance of such a cell discharged at a constant current of 6 ma. at room temperature. Cell utilization corresponded to 74 percent of the theoretical capacity. An energy density of over 60 watt/hours/lb. was achieved.

EXAMPLE II

A second cell was constructed using the procedure of Example I but using $NiS_2$ as the positive plate material. The weight ratio of $NiS_2$ to aluminum fiber was 8:2 but the total amount of positive material in the cell was 5.0 grams. FIG. 4 illustrates the discharge performance for such a well discharged through a 304 ohm load.

EXAMPLE III

Another Leclanche type cell was made following the procedure of Example I but with the electrolyte comprising a 1 M solution of lithium perchlorate in a solvent comprising 75 weight percent tetrahydrofuran and 25 weight percent propylene carbonate. This cell and another cell made according to Example I were discharged under identical loads at $-18°$ C. ($0°$ F.). The discharge performance of the cell made according to Example I and the cell of this example are shown in FIGS. 5 and 6 respectively.

EXAMPLE IV

This example illustrates that satisfactory positive electrodes can be made by pressing the active material onto a conductive screen. Test electrodes of this type were made by pressing a paste of positive material and electrolyte made according to Example I (but with a nickel sulfide to aluminum fiber ratio of 9.5 to 5) onto expanded metal grids, some of which were made of aluminum and others of which were made of nickel. The grids were 2.15 inch wide and 1.40 inch high. Each electrode carried 7.5 grams of positive material. The paste was pressed onto the grids under a total load of 5 tons. The electrodes were discharged between lithium sheets in a polyethylene container using non-woven polypropylene fabric (E1452 fabric produced by Kendall Fiber Products Co.) as a separator. At a discharge rate of 40 ma. (a current density of 1 ma./cm.$^2$) approximately 2 ampere-hours were obtained. A voltage plateau was exhibited at 1.3 to 1.4 volts. The cells gave acceptable performance at both high and low temperatures, e.g. $160°$ F. and $32°$ F.

EXAMPLE V

A button cell was made according to the design shown in FIG. 2 using an aluminum case with a wall thickness between about 0.010 and 0.020 inch, an outside diameter of about 1.0 inch and a height of about 0.375 inch. The separator 22 was made from nonwoven, polypropylene mat above 0.009 inch thick. The lithium electrode 24 was punched from 0.040 inch lithium foil. The positive plate was prepared by pressing 2.0 grams of a mixture of 80 wt. percent $Ni_3S_2$ and 20 wt. percent aluminum fibers of the type described in Example I into the bottom of the case at a pressure of 100 lb./cm.$^2$.

Then the positive plate was saturated with a 1 M solution of lithium perchlorate in propylene carbonate. A magnesium contact 26 about 0.2 inch thick was placed in contact with the lithium electrode 24 which in turn was in contact with the separator 22. The magnesium contact was sealed in place with an epoxy potting compound. The cell was tested by discharging it at an average current of 2.3 ma. About 65% of the $Ni_3S_2$ was utilized.

With respect to cells constructed according to Example V tests were made to determine the effect of varying the compaction pressure used in forming the $Ni_3S_2$—Al electrode. Cells were made according to the procedure set in Example V but with the positive electrodes compacted under different pressures. FIG. 7 illustrates the discharge performance at room temperature of button cells having positive electrodes pressed at 1000, 200 and 100 lbs./cm.$^2$. The cells were discharged through 560 ohm loads. It is evident that best results were obtained with electrodes pressed at 100 lbs./cm.$^2$. Other tests indicate that with an overall cell weight of about 6 grams an energy density of 50-60 watt-hours/lb. is possible using electrode compaction pressures of 75-200 lb./cm.$^2$. A mercury cell of comparable size discharged under the same conditions produces about 30 watt-hours/lb.

The use of compaction to form the positive electrode resulted from observance of cell failure due to loss of electrolyte paths between the shrinking lithium electrode and the positive electrode. This problem is diminished by compaction of the positive mass (which expands during the discharge) since it allows more nickel sulfide to be placed in the same size cell.

It has been determined that if water is eliminated from the cells, they are capable of stable discharges after at least 200 hours at $200°$ F. This performance is to be contrasted with conventional mercury cells which leak badly after about one hour at this temperature. Water is kept out of the cells by proper drying of the positive plate mixture and the electrolyte as well as by fabricating the battery in a dry atmosphere. Testing of cells at varying temperatures has been accomplished by thermally cycling them between $160°$ F. and $28°$ F. (or $-29°$ F. where the cell electrolyte is diluted with 75% tetrahydrofuran). Cells tested in this manner showed stable discharge when held at selected temperatures for periods of 1-2 hours.

Cells made with positive plates comprising NiS and the other nickel sulfide species enumerated herein above differ from those of the foregoing examples in ease and cost of construction as well as energy densities and cell voltages. However, they have the same advantages of long shelf life and operating life plus acceptable performances over a wide temperature range extending from below 0° F. to as high as 160° F., and energy densities comparable to those of mercury cells and other lithium cells known to the prior art.

It is to be noted that the amount of aluminum binder employed may be varied. It is preferred that it comprise 5–20% of the positive mixture. More than 20% may be used but it offers minor advantage. Less than about 5% is avoided since then there is not enough to hold the positive electrode together and maintain a good conductive path. As noted above, lithium sulfide is formed during discharge. This by-product impedes the electrochemical reaction as well as tending to force the electrode apart because it occupies a larger volume than the electrolyte which it displaces. Use of at least 5% aluminum is adequate to minimize the problems resulting from formation of lithium sulfide. The amount of binder also may be decreased where the positive electrode is compacted. In button cells of the type described in Example V, the amount of aluminum preferably is kept to within about 10–20%.

While the sizes of the aluminum particles has not been found to be critical, it is preferred that the aluminum fibers have at least 0.002 inch minimum dimension in cross-section and at least about 0.125 inch long. The maximum size tolerable depends in part on the size of the electrode, but preferably the fibers should not have a cross sectional dimension greater than about 0.020 inch and the length should not be greater than about 0.50 inch. If aluminum powder is used, it is preferred that average particle diameter be in the order of about 0.002 inch.

The particle size of the nickel powder also is not critical, but it is preferred that it be in the order of about 0.002 inch which is the size utilized in the foregoing examples.

The concentraton of lithium perchlorate in the electrolyte is not critical but preferably is within the range of ½ to 1.2 M. Optimum conductivity is achieved with a 1 M solution of lithium perchlorate in propylene carbonate. Corresponding concentrations of potassium hexafluorophosphate in propylene carbonate or other suitable aprotic organic solvent have been found to yield cells with performances comparable to those of the cells described in the foregoing examples.

What is claimed is:

1. An electrical current-producing cell having a lithium metal anode, a non-aqueous electrically conducting electrolyte comprising an ionizable salt dissolved in an aprotic organic solvent, and a cathode comprising a mixture of nickel sulfide and aluminum in contact with said electrolyte.

2. A cell according to claim 1 wherein said aluminum is in the form of fibers.

3. A cell according to claim 1 wherein said aluminum is in the form of powder.

4. A cell according to claim 1 wherein about 5–20% by weight of said mixture is aluminum.

5. A cell according to claim 1 wherein the aluminum in said mixture is in the form of fibers and said nickel sulfide is $Ni_3S_2$.

6. A cell according to claim 1 wherein said mixture is on and directly contacts a conductive metal substrate that comprises a material from the class consisting of aluminum and nickel.

7. A cell according to claim 1 wherein said nickel sulfide comprises at least one of the following species: $Ni_3S_2$, $NiS_2$, and NiS.

8. A cell according to claim 7 wherein said nickel sulfide is $Ni_3S_2$.

9. A cell according to claim 7 wherein said nickel sulfide is $NiS_2$.

10. A cell according to claim 2 wherein said fibers have a length between about 0.125 inch and about 0.50 inch.

11. A cell according to claim 2 wherein said fibers have a diameter between about 0.002 inch and about 0.020 inch.

12. A cell according to claim 3 wherein said powder has an average particle diameter in the order of 0.002 inch.

13. A cell according to claim 1 wherein said cell also comprises a case made of aluminum with said case directly exposed to said cathode and electrolyte.

References Cited
UNITED STATES PATENTS

| | | | |
|---|---|---|---|
| 2,902,530 | 9/1959 | Eisen | 136—20 |
| 3,043,896 | 7/1962 | Herbert et al. | 136—6 |
| 3,030,400 | 4/1962 | Giraitis | 136—83 X |
| 3,248,265 | 4/1966 | Herbert | 136—6 |
| 3,279,952 | 10/1966 | Minnick | 136—100 |
| 3,393,092 | 7/1968 | Shaw et al. | 136—6 |
| 3,393,093 | 7/1968 | Shaw et al. | 136—6 |
| 3,415,687 | 12/1968 | Methlie | 136—100 |
| 3,423,242 | 1/1969 | Meyers et al. | 136—6 |
| 3,508,966 | 4/1970 | Eisenberg | 136—6 |
| 3,466,197 | 9/1969 | Bawa | 136—86 |
| 2,739,997 | 3/1956 | Carrick et al. | 136—57 |
| 3,099,899 | 8/1963 | Horn et al. | 136—57 X |

ANTHONY SKAPARS, Primary Examiner

U.S. Cl. X.R.
136—100 R, 111